United States Patent [19]
Nanaji

[11] Patent Number: 5,755,854
[45] Date of Patent: May 26, 1998

[54] TANK ULLAGE PRESSURE CONTROL

[75] Inventor: Seifollah S. Nanaji, Greensboro, N.C.

[73] Assignee: Gilbarco Inc., Greensboro, N.C.

[21] Appl. No.: 811,362

[22] Filed: Mar. 4, 1997

[51] Int. Cl.⁶ .................................................. B01D 53/047
[52] U.S. Cl. .......................... 95/11; 95/19; 95/21; 95/98;
95/105; 95/146; 95/111; 95/113; 95/122;
95/130; 95/144
[58] Field of Search ........................... 95/19, 21, 22,
95/98, 104, 105, 146, 11; 96/113, 122,
130, 133, 144, 111

[56] References Cited

U.S. PATENT DOCUMENTS

| | | | |
|---|---|---|---|
| 3,282,027 | 11/1966 | Johnson et al. | 96/113 X |
| 3,776,283 | 12/1973 | Kramer et al. | 96/113 X |
| 3,867,111 | 2/1975 | Knowles | 95/21 |
| 3,881,894 | 5/1975 | Onufer | 95/146 X |
| 3,902,874 | 9/1975 | McAndrew | 95/146 |
| 3,918,932 | 11/1975 | Lee et al. | 95/146 X |
| 3,926,230 | 12/1975 | Stary et al. | 95/146 X |
| 3,979,175 | 9/1976 | Kattan et al. | 95/104 X |
| 3,996,975 | 12/1976 | Hansel | 96/113 X |
| 4,058,147 | 11/1977 | Stary et al. | 96/130 X |
| 4,670,028 | 6/1987 | Kennedy | 55/48 |
| 4,995,890 | 2/1991 | Croudace | 96/122 X |
| 5,038,838 | 8/1991 | Bergamini et al. | 141/59 |
| 5,220,799 | 6/1993 | Lievens et al. | 95/19 X |
| 5,294,246 | 3/1994 | Gardner, Sr. | 95/21 X |
| 5,389,125 | 2/1995 | Thayer et al. | 96/122 X |
| 5,415,196 | 5/1995 | Bryant et al. | 137/14 |
| 5,464,466 | 11/1995 | Nanaji et al. | 95/45 |
| 5,484,000 | 1/1996 | Hasselmann | 141/7 |
| 5,571,310 | 11/1996 | Nanaji | 96/4 |
| 5,611,841 | 3/1997 | Baker et al. | 95/50 |

FOREIGN PATENT DOCUMENTS

| | | |
|---|---|---|
| 0 799 790 A1 | 10/1997 | European Pat. Off. |
| 3708950A1 | 8/1988 | Germany. |
| 1341051 | 12/1973 | United Kingdom. |

OTHER PUBLICATIONS

Brochure from Environmental Waste Recycling Technology, Inc. of California; Undated, admitted prior art.
Litton Brochure–"What Are Litton InstaGas Systems?", Publication #10410–1 Undated, admitted prior art.
Engelhard Process Chemicals GmbH; "Sorbead The Versatile Adsorption Agent–Superior Quality, Economical, Environmentally Friendly" Copyright 1994.
Energy Science and Technology; Gasoline Vapor Recovery, Nov. 1994, Raffinerie Harburg.

*Primary Examiner*—Robert Spitzer
*Attorney, Agent, or Firm*—Rhodes Coats & Bennett, L.L.P.

[57] ABSTRACT

The invention relates to an apparatus and method for controlling the pressure in a fuel tank ullage. The apparatus includes a vapor pump which withdraws vapors from the tank ullage responsive to a signal generated by a pressure sensor in communication with the ullage. The vapors are directed to a canister containing a VOC-adsorbent material where the VOC content of the vapor is removed. Non-polluting VOC-free air is vented from the canister to the atmosphere. The invention also contemplates the provision of a second canister which would accept the tank ullage vapors after the material in a first canister becomes saturated. A portion of the VOC-free air exiting the first canister is used a purge gas to regenerate the saturated material in the first canister. The operation of the multiple canisters would alternate between adsorption and regeneration until the tank ullage pressure is reduced to below a threshold level.

29 Claims, 2 Drawing Sheets

TANK ULLAGE PRESSURE CONTROL

BACKGROUND OF THE INVENTION

The present invention relates to an apparatus for controlling the pressure in a tank ullage to prevent fugitive emissions of polluting Volatile Organic Chemical ("VOC") vapors. Common sources of these vapors include dry-cleaning solvents, and fuels such as gasoline.

Vapor recovery fuel dispensers have been common in California for some time, and the Clean Air Act of 1990 has mandated their use in many other localities across the United States. The development of vapor recovery fuel dispensers began in the early '70's and included some dispensers that had assist-type mechanisms for pumping the vapors to the underground storage tank in service stations. These did not generally gain favor and, throughout the 1970's and 1980's, balance system vapor recovery fuel dispensers were more common. In the balance system, a closed, sealed path is established between the fuel tank being filled and the underground tank. The movement of the liquid from the underground tank to the automobile tank creates a higher pressure area in the automobile tank and a lower pressure area in the underground tank to induce the vapor to move from the automobile tank to the underground tank. The systems were merely tolerated, because they were very cumbersome and prone to failure.

In the 1990's, new vapor recovery fuel dispensers are often equipped with vapor pumps to actively pump the vapor to the underground storage tank, as embodied in the VAPORVAC® line of dispensers manufactured and sold by Gilbarco, Inc., Greensboro, N.C., the assignee of the present application. Such active, assisted systems are also sold by the Wayne Division of Dresser Industries under the name WAYNEVAC®, and by Tokheim Corporation of Fort Wayne, Ind. under the name MAXVAC®.

These systems are exemplified by numerous issued U.S. Pat. Nos. including Re. 35,238 to Pope, 5,195,564 to Spalding, and 5,333,655 to Bergamini. The disclosures of these three patents are incorporated herein by reference.

The assisted vapor recovery systems of the 1990's have proven to be very capable of transporting the vast majority of the vapor from the filler pipe of the automobile to the underground storage tank. However, in some cases, the act of pumping of the vapor can lead to pressurization of the underground storage tanks and associated piping. Also, other factors such as temperature changes can lead to pressurization. The underground storage tanks and piping have an area above the liquid known as the ullage, in which air and fuel vapors reside. The pressurized air and fuel vapors will have a tendency to leak out of any hole in the tank or piping of the system, thus allowing the release of the polluting fuel vapor to the atmosphere, precisely the situation that the vapor recovery fuel dispensers are intended to avoid.

It has also been found that the balance systems which have been in use for so many years can be subject to fugitive emissions of this sort. Various pressure changes can occur in the tank, regardless of whether there is pumping going on, including diurnal temperature changes and the like, leading to an overpressure in the underground tank. These overpressures are of concern, since the result can be fugitive emissions of pollutants to the atmosphere.

The assignee of the present applicant addressed this problem in U.S. Pat. No. 5,571,310 issued Nov. 5, 1996 and U.S. Pat. No. 5,464,466 issued Nov. 7, 1995. The entire disclosure of those patents is incorporated herein by reference. They disclose a fuel storage tank vent filter system in which vapors from the underground tanks are directed to a chamber having a fractionating membrane. The membrane permits transmission of hydrocarbons through it in preference differentially to atmospheric vapors. That system calls for a pump to be arranged to draw the pollutants through the membrane as permeate and redirect them to the underground tank, permitting air as retentate to be released to the vent pipe of the service station tank arrangement.

However, alternate systems to remove volatile hydrocarbons from the ullage may also prove useful in reducing the pressure in the ullage to reduce the risk of fugitive emissions. The present invention provides such an alternate which may provide a system that is less expensive and easier to maintain than the membrane-based system.

SUMMARY OF THE INVENTION

The present invention provides an apparatus for controlling the pressure in a fuel tank ullage. The apparatus includes a vapor pump in communication with the fuel tank ullage and an inlet valve manifold in communication with the vapor pump. The inlet valve manifold has a first exit and a second exit. A pressure sensor is provided for detecting the pressure in the fuel tank ullage. A first canister containing a hydrocarbon-adsorbent material is positioned between the inlet valve manifold first exit and an exhaust manifold. A second canister containing a hydrocarbon-adsorbent material is positioned between the inlet valve manifold second exit and an exhaust manifold. The exhaust valve manifold includes a first entrance in communication with the first canister, a second entrance in communication with the second canister, a first exit in communication with the tank ullage and a second exit connected to a recirculation line. The recirculation line connects the inlet valve manifold and the exhaust valve manifold. The apparatus further includes a controller adapted to receive input from the pressure sensor and output control signals to the vapor pump and apparatus manifolds to activate the vapor pump and control the inlet valve manifold and exhaust valve manifold when the ullage pressure exceeds a pressure threshold to vent substantially hydrocarbon-free air to the atmosphere and to return hydrocarbons trapped in the adsorbent material to the fuel tank ullage.

The inlet valve manifold includes a first inlet valve positioned between the vapor pump and the valve manifold first exit; a second inlet valve positioned between the vapor pump and the valve manifold second exit; a first purge valve positioned between the recirculation line and the inlet valve manifold first exit; and a second purge valve positioned between the recirculation line and the inlet valve manifold second exit. The inlet valve manifold directs the incoming vapor flow alternately to either the first canister or to the second canister. This valve manifold also directs hydrocarbon-free air from the first canister to the second canister to regenerate hydrocarbon-saturated adsorbent material in the second canister. This flow could be reversed to regenerate hydrocarbon-saturated material in the first canister.

The exhaust valve manifold includes a first return valve positioned between the first canister outlet and the exhaust valve manifold first exit; a second return valve positioned between the second canister outlet and the exhaust valve manifold second exit; a first atmospheric vent connected to the first canister outlet; a second atmospheric vent connected to the second canister outlet; a first recirculation valve positioned between the first canister outlet and the recirculation line; and a second recirculation valve positioned between the second canister outlet and the recirculation line. The exhaust valve manifold directs hydrocarbon-free air to the atmosphere from either the first canister or the second canister via the atmospheric vents. This manifold also controls the return of hydrocarbon vapors resulting from the regeneration of the canisters to the tank. Further this manifold directs at least a portion of the hydrocarbon-free air exiting either the first canister or the second canister to the canister being regenerated.

Both the first canister and the second canister may include at their outlets a hydrocarbon detector for monitoring the hydrocarbon content of the vapors exiting each canister.

The invention also provides a method of controlling the pressure in a fuel tank ullage including the steps of monitoring the pressure in the fuel tank ullage and withdrawing vapor from the fuel tank ullage when the ullage pressure exceeds a threshold value. The vapor is fed through a first canister containing a hydrocarbon vapor adsorbing material while permitting non-polluting components to exit the first canister. The feeding step continues until the hydrocarbon-adsorbing material in the first canister is saturated. A majority of the non-polluting components from the first canister are exhausted to the atmosphere and at least a portion of the non-polluting components from the first canister are fed to a second canister containing a saturated hydrocarbon-adsorbing material. There the non-polluting components desorb hydrocarbon vapor from the saturated material. The desorbed hydrocarbon vapor and the at least a portion of the non-polluting components are returned to the fuel tank ullage.

The method also includes halting the feeding of a least a portion of the non-polluting components from the first canister to the second canister when substantially all the hydrocarbon is desorbed from the hydrocarbon-adsorbing material in the second canister.

The method also relates to monitoring the output of the second canister for the presence of a minimum level of desorbed hydrocarbon and shifting the feed of the withdrawn vapor to the second canister permitting non-polluting vapor components to exit the second canister. The feeding step continues until the hydrocarbon-adsorbing material in the second canister is saturated. A majority of the non-polluting components from the second canister are exhausted to the atmosphere and at least a portion of the non-polluting components from the second canister are fed to the first canister to desorb hydrocarbon vapor therefrom. The method further includes returning the desorbed hydrocarbon vapor and the at least a portion of the non-polluting components to the fuel tank ullage.

It should be understood that both the foregoing general description and the following detailed description are exemplary and explanatory only and are not restrictive of the invention as claimed. The accompanying drawings, which are incorporated in and constitute a part of this specification, illustrate one embodiment of the invention and, together with the description, serve to explain the principles of the invention.

BRIEF DESCRIPTION OF THE DRAWINGS

The invention will be better understood after a reading of the Detailed Description of the Preferred Embodiments and a review of the drawings in which.

DETAILED DESCRIPTION OF THE PREFERRED EMBODIMENTS

Figure 1:
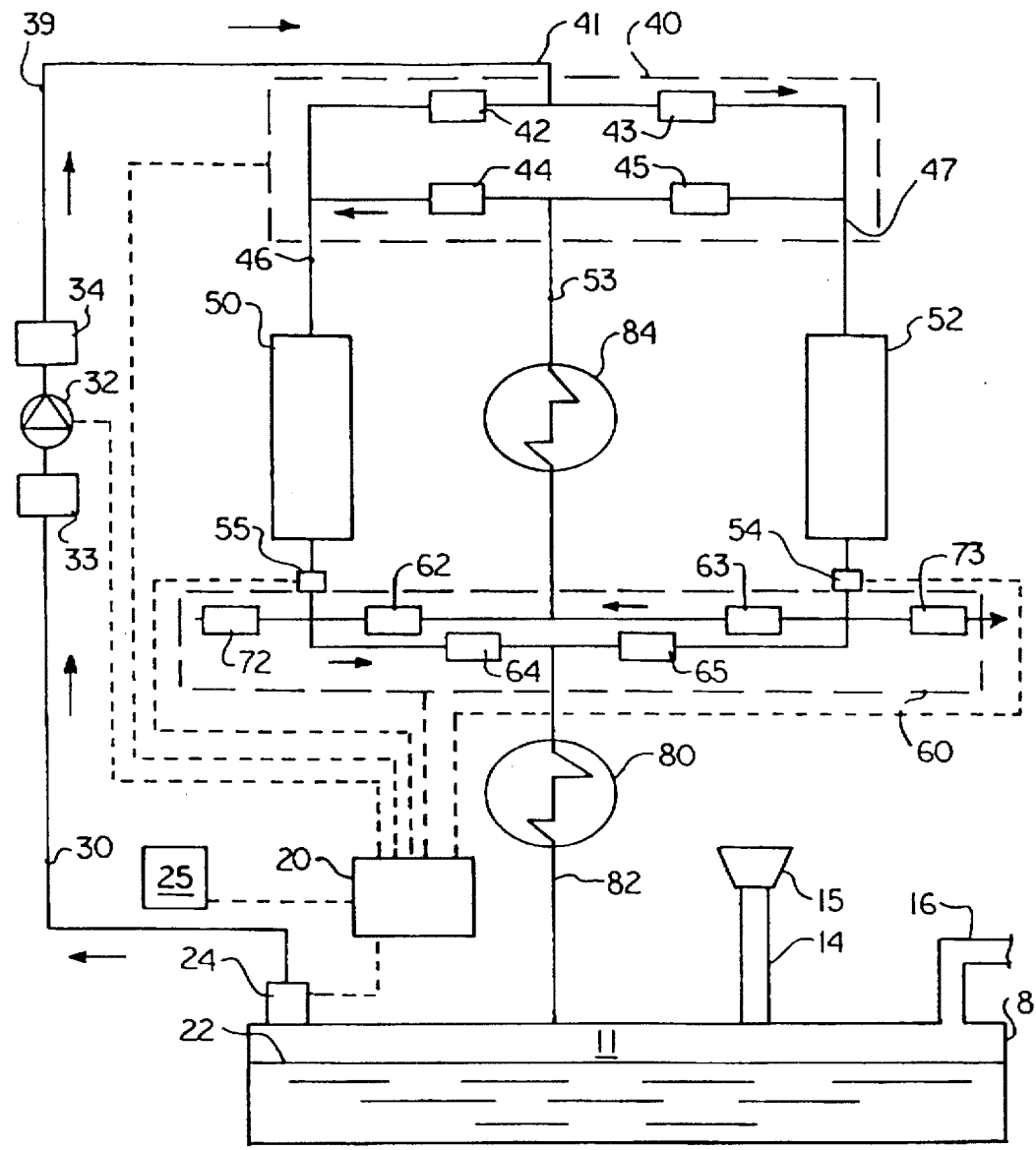
FIG. 1 is a specific schematic view of a preferred embodiment of the invention.

Referring now to FIG. 1, there is shown a storage tank 8 which is underground, but need not be an underground tank for purposes of this invention. The tank 8 holds a liquid containing VOC's which could include, but is not limited to, a fuel 22 such as gasoline. As discussed above, the present invention may be used with a variety of liquids containing VOCs. Any reference herein to use of the present invention for hydrocarbons is exemplary only. The scope of the present invention includes its application to any VOC-containing liquid. Above the liquid 22 in the tank 8 is a volume known as the ullage 11 holding vapor within the tank 8. The ullage 11 contains, as well, vapors recovered from automobile fuel tanks via a vapor recovery system. The vapor recovery system may be an assist system as described herein above or a balance system. Other contents of the ullage 11 will be vapors of the liquid fuel 22 and, typically, air. The air arrives in the tank 8 through numerous possible paths. Primarily, the air arrives through a vapor recovery system as discussed above. The vapor return from such a system to the tank 8 is shown at 16. Air might also be ingested through pressure vacuum valve 15 atop vent pipe 14. If the pressure in the ullage 11 falls to a low level, the pressure vacuum valve 15 opens in conventional fashion to permit air to be ingested and avoid potentially dangerous under pressure in the tank 8.

An electronic controller 20 is connected between various components of the apparatus and pressure sensors 24 and 25. Pressure sensor 24 is in communication with the ullage 11 and outputs a pressure signal to electronic controller 20. Pressure sensor 24 may also output a temperature signal indicative of the temperature in the ullage 11. Sensor 25 measures and signals to controller 20 the current atmospheric pressure as a reference for comparison to the pressure in the tank ullage 11.

The controller 20 can be a suitable controller such as a programmable controller or other microprocessor based control. Those of ordinary skill in the art will realize that the controller may be made using various forms of analog or digital electrical circuits or perhaps pneumatic, hydraulic, mechanical or fiber optics technology. The controller 20 has outputs to various items shown by dotted line FIG. 1, including a vapor pump 32, inlet valve manifold 40, exhaust valve manifold 60, and, if installed, a heat exchanger 80. It also receives temperature or pressure signals from sensors 24,25. The dotted lines shown extending to the various major components should be understood to represent and to include individual operable connections to the sub-components thereof The apparatus also includes vapor pump 32 which is in communication with ullage 11 via conduit 30. The vapor pump is in communication via conduit 39 with the inlet valve manifold shown in dotted line at 40. The inlet valve manifold 40 has a first exit 46 and a second exit 47.

The apparatus further includes a first canister 50 and a second canister 52, each containing a VOC-adsorbent material, such as activated charcoal. Each canister is in communication with the inlet valve manifold 40. The first canister 50 is positioned between the inlet valve manifold first exit 46 and an exhaust valve manifold 60 shown in dotted line. The second canister 52 is positioned between the inlet valve manifold second exit 47 and the exhaust valve manifold 60. The exhaust valve manifold 60 communicates with the inlet valve manifold 40 via recirculation line 53.

The inlet valve manifold 40 includes a first inlet valve 42 and a second inlet valve 43 each in communication with the vapor pump 32. The first inlet valve 42 is positioned between the inlet valve manifold vapor entrance 41 and the valve manifold first exit 46. The second inlet valve 43 is positioned between the inlet valve vapor manifold entrance 41 and the inlet valve manifold second exit 47. The inlet valve manifold also includes a first purge valve 44 and a second purge valve 45 each in communication with recirculation line 53. The first purge valve 44 is positioned between the recirculation line 53 and the inlet line manifold first exit 46. The second purge valve 45 is positioned between the recirculation line 53 and the inlet valve manifold second exit 47.

Although the inlet valves 42,43 and the purge valves 44,45 are shown as separate valves, the function of each pair of valves could be combined in a single unit. For example, inlet valves 42,43 could be combined into a single two-way valve capable of shifting the discharge of the vapor pump 32 to either the inlet valve manifold first exit 46 or inlet valve manifold second exit 47 responsive to a control signal from controller 20. The use of either a single valve or dual valves as is illustrated in FIG. 1 will vary depending upon economic considerations and operating conditions. The selection of a valve configuration of the inlet valves and the purge valves is within the capability of one of ordinary skill in the art.

The exhaust valve manifold 60 communicates with the first canister 50, second canister 52, recirculation line 53 and the tank ullage 11 (through optional heat exchanger 80). The exhaust valve manifold 60 includes first recirculation valve 62 and second recirculation valve 63. The first recirculation valve 62 is positioned between first canister 50 and recirculation line 53. The second recirculation valve 63 is positioned between the second canister 52 and the recirculation line 53. First atmospheric vent 72 and second atmospheric vent 73 are provided for first canister 50 and second canister 52, respectively.

These vents permit the release to the atmosphere of the pollutant-free air exiting either the first canister or the second canister. The recirculation valves 62,63 return a portion of the stream exiting their respective canisters to the opposite canister undergoing regeneration as is explained in more detail below. The exhaust manifold 60 also includes first return valve 64 and second return valve 65. The first return valve 64 is positioned between the first canister and the tank ullage 11. The second return valve 65 is positioned between the second canister and the tank ullage 11. Vapors are returned to the tank ullage 11 via return conduit 82 (and, optionally, heat exchanger 80).

As was the case with the inlet valves 42,43 and the purge valves 44,45 in the inlet valve manifold 40, the functions of the recirculation valves 62,63 and the return valves 64,65 may be combined into a single two-way valve for each pair of valves. Again, selection of a valving arrangement is within the ordinary skill in the art.

The flow exiting the exhaust valve manifold 60 can follow two paths. First, nonpolluting components exiting either canister may exit via the recirculation line 53 as a regeneration gas as described below. Alternatively, the flow may return to the tank ullage 11 via the return valves 64,65. As will be explained in more detail herein below, the flow follows only one of these paths at any given time.

Although the apparatus is illustrated with a single recirculation line 53, other arrangements are possible. By way of non-limiting example, a separate recirculation line may be provided for each canister. This arrangement would require separate purge valves as opposed to the single two-way valve option described above. Also the purge valves need not share the inlet valve manifold's first and second exits 46,47. The discharge of each of those valves could be directed to the appropriate canister via a separate line.

Optional components for the apparatus of the present invention include flame arrestors 33, 34 which may be positioned on the suction and/or discharge sides of vapor pump 32. The flame arrestor is a safety item that may be installed on an as-needed basis. A second optional component is heat exchanger 80 positioned between the exhaust valve manifold 60 and the tank ullage 11. During the operation of this apparatus, it may be desirable to cool the flow returning to the tank ullage. The need for such cooling would depend on a variety of factors to include ambient temperature, tank ullage temperature, and the temperature of the flow returning to the tank ullage. The design/sizing of this heat exchanger is well within the ability of one with ordinary skill in the art.

A second heat exchanger 84 may be installed in recirculation line 53 between the inlet valve manifold 40 and the exhaust valve manifold 60. The purpose of this heat exchanger 84 is to heat the air flow through the recirculation line 53 to improve the regeneration of the adsorbent material contained in canisters 50, 52. Typically, this heat exchanger 84 will be cycled on and off by controller 20 as needed for the proper operation of the system. For instance, it is believed that during winter months having a low average daily temperature, it may be desirable to heat the flow through the recirculation line. Determining the need for and sizing this heat exchanger is within the capability of one of ordinary skill in the art.

Though the apparatus of the present invention will function properly with the components described above, the inclusion of certain safety items is desirable. These safety items include temperature sensors (not shown) positioned at the discharge of the vapor pump 32 and at the outlet of the canisters 50, 52 to detect overheating and shut down operation of the apparatus, if needed. The apparatus may also include hydrocarbon detectors 54, 55 positioned at the canister outlets to detect potentially explosive hydrocarbon levels and again shut down the apparatus if need be. Additional hydrocarbon detectors may be incorporated into atmospheric vents 72, 73 to shut down operation of the apparatus if excessively high levels of hydrocarbons are being vented to the atmosphere.

An additional safety device may be incorporated into the inlet valves 42, 43, purge valves 44, 45, return valves 64, 65 and the recirculation valves 62, 63. As will be explained in more detail below, during the operation of the apparatus, only one of each of these pairs of valves should be open at any given time. Accordingly, it is desirable to include a valve interlock to ensure that if one valve of a pair is open, then the second will be closed. The interlock could take either a mechanical or electronic form. In a mechanical form, the interlock could include a member attached at each end to the valves and physically situated so that when one valve is open the other is forced to close. Alternatively, the interlock could be incorporated into the control logic of controller 20 to permit only one valve of the pair to be open at any given time.

The canisters 50, 52 are filled with a VOC-adsorbent material. The practice of the present invention includes the selection and use of a suitable material for the VOC being stored. However activated carbon is believed to be most desirable for adsorbing hydrocarbon from the vapors drawn from the tank ullage. Moreover, activated carbon is believed to be desirable for removing VOC's of other types as well.

The operation of the apparatus will be described with reference to FIGS. 1 and 2. The electronic controller 20 monitors the pressure in tank ullage 11 through the pressure sensor 24. When sensor 24 detects a pressure in tank ullage 11 above a threshold level, a signal is output from controller 20 to vacuum pump 32 to initiate withdrawal of vapors from the tank ullage. The valve arrangement at this point is shown in FIG. 1 and is detailed in Table 1 below:

TABLE 1

| Valve | Position |
| --- | --- |
| First inlet valve (42) | closed |
| First purge valve (44) | closed |
| Second inlet valve (43) | open |
| Second purge valve (45) | closed |
| First atmospheric vent (72) | closed |
| First return valve (64) | closed |
| First recirculation valve (62) | closed |
| Second atmospheric vent (73) | open |
| Second return valve (65) | closed |
| Second recirculation valve (63) | closed |

Thus, the vapors are directed through the second inlet valve 43 to the second canister In the canister, the hydrocarbon component of the tank ullage is adsorbed by the material in canister 52. The flow exiting canister 52 consists of the substantially hydrocarbon-free air which is vented to atmosphere by atmospheric vent 73. This process will continue until the material in the second canister 52 is saturated with hydrocarbon or until the pressure in the tank ullage 11 is reduced to below a threshold level. It should be noted that the operation of the apparatus at this juncture may be continuous or intermittent, depending on the amount of running time required to bring the tank ullage pressure within limits. In its simplest sense, the method of the present invention includes monitoring the pressure in the fuel tank ullage; withdrawing vapor from the fuel tank ullage when the ullage pressure exceeds a threshold value, feeding the vapor through a canister containing a hydrocarbon vapor adsorbing material; and exhausting the hydrocarbon-free air exiting the canister to the atmosphere.

The hydrocarbon removal taking place in second canister 52 is monitored by a hydrocarbon detector 54 positioned at the canister outlet. The hydrocarbon detector evaluates the proportion of hydrocarbons in the canister exhaust and applies a signal indicative of same to the electronic controller 20. When the hydrocarbon content approaches limits indicating the hydrocarbon-adsorbent material in canister 52 is nearly saturated, vapor flow is diverted by the inlet valve manifold to the first canister 50.

Figure 2:
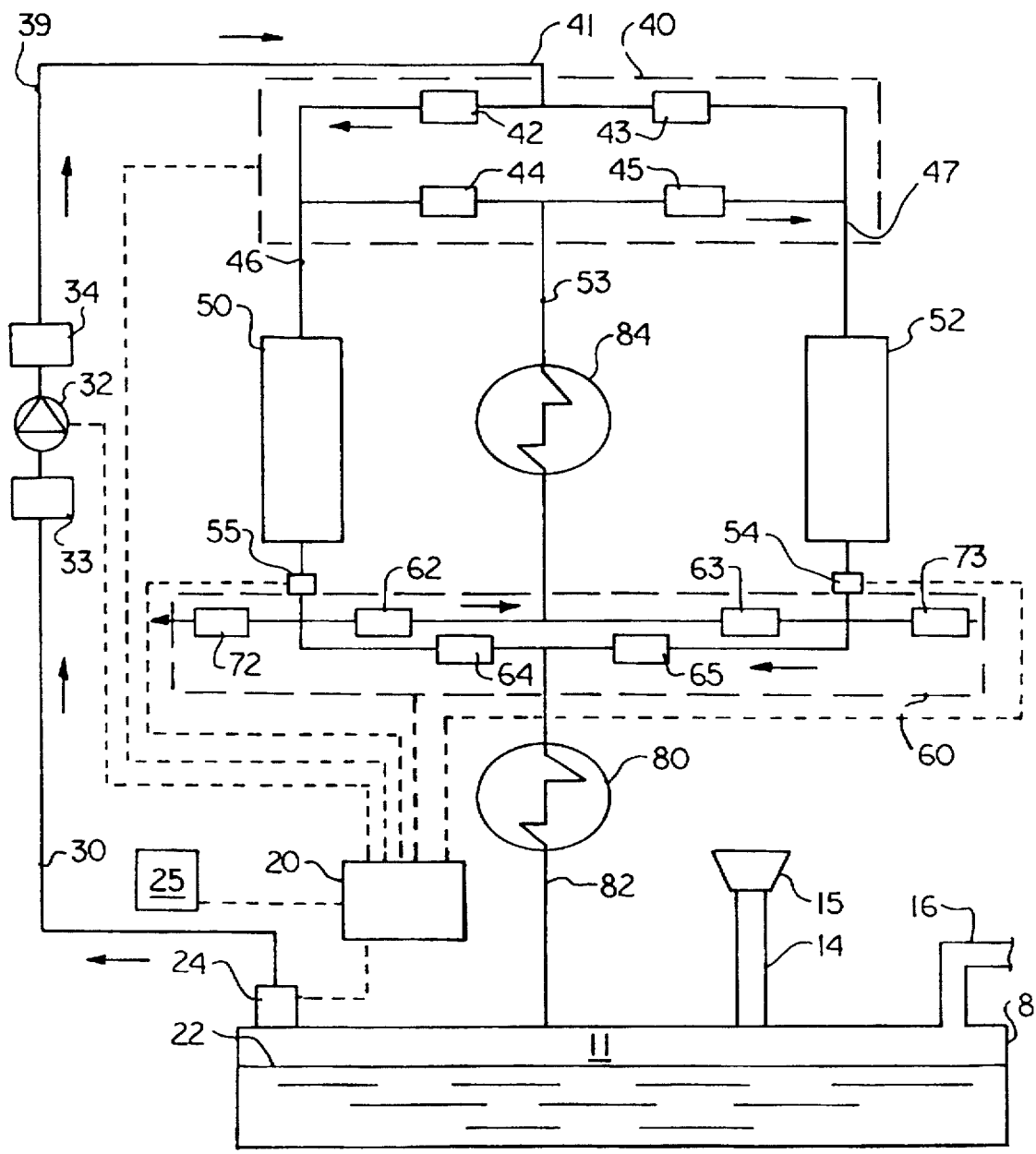
FIG. 2 is the schematic view of FIG. 1 showing vapor flow reversed through the invention.

Referring now to FIG. 2, this diversion is accomplished by output signals from controller 20 which close second inlet valve 43, second atmospheric vent 73 and opens first inlet valve 42 and first atmospheric vent 72. The remaining valves are positioned by the controller as shown in the Table 2 below:

TABLE 2

| Valve | Position |
| --- | --- |
| First inlet valve (42) | open |
| First purge valve (44) | closed |
| Second inlet valve (43) | closed |
| Second purge valve (45) | open |
| First atmospheric vent (72) | open |
| First return valve (64) | closed |
| First recirculation valve (62) | open |
| Second atmospheric vent (73) | closed |

TABLE 2-continued

| Valve | Position |
| --- | --- |
| Second return valve (65) | open |
| Second recirculation valve (63) | closed |

Vapor flow now enters the first canister 50, where hydrocarbon adsorption takes place. A portion of the hydrocarbon-free air exiting the first canister 50 flows through first recirculation valve 62 to recirculation line 53. The recirculation line 53 directs this flow back to the inlet valve manifold 40 through second purge valve 45 and into second canister 52.

Thus a portion of the flow exiting the first canister regenerates the saturated hydrocarbon-adsorbent material in the second canister 52. It is believed that up to about 30 percent of the first canister's flow is required for regeneration. Desirably, the recirculation valves 62, 63 are proportional valves so that the amount of regenerative flow can be varied as needed.

The vapors exiting the second canister 52 during regeneration will have a high hydrocarbon content and cannot be vented to atmosphere. These vapors are directed back to the tank ullage 11 via second return valve 65 and return conduit 82. The apparatus will continue to operate in this manner until the pressure in the tank ullage 11 has been reduced to a specified threshold level, at which time the vacuum pump 32 will be stopped by controller 20. As will be apparent to one of ordinary skill in the art, the pressure in the tank ullage 11 decreases because more volume is removed by vacuum pump 32 than is returned from the canister undergoing regeneration.

The hydrocarbon sensor 54 at the second canister outlet evaluates the concentration of hydrocarbons in the flow therefrom and supplies a signal indicative of same to the electronic controller 20. If the hydrocarbon content of the flow decreases sufficiently to indicate that regeneration is complete, then output signals from the controller 20 close the first recirculation valve 62, second purge valve 45, and second return valve 65, isolating the second canister 52. That canister is then ready for service when first canister 50 becomes saturated as detected by a hydrocarbon detector 55 positioned at the first canister discharge.

The hydrocarbon sensor 55 at the first canister outlet evaluates the proportion of hydrocarbons in the flow therefrom and supplies a signal indicative of same to the electronic controller 20. When the hydrocarbon content approaches limits indicating that the hydrocarbon-adsorbent material is nearly saturated, flow through the apparatus is then reversed from the arrangement shown in FIG. 2 so that the second canister 52 begins to adsorb hydrocarbon and the first canister 50 is regenerated. Valve positioning at this point is illustrated in Table 3 below:

TABLE 3

| Valve | Position |
| --- | --- |
| First inlet valve (42) | closed |
| First purge valve (44) | open |
| Second inlet valve (43) | open |
| Second purge valve (45) | closed |
| First atmospheric vent (72) | closed |
| First return valve (64) | open |
| First recirculation valve (62) | closed |

TABLE 3-continued

| Valve | Position |
| --- | --- |
| Second atmospheric vent (73) | open |
| Second return valve (65) | closed |
| Second recirculation valve (63) | open |

The operation is the same as described above with hydrocarbon being adsorbed in the second canister 52 and the material in first canister 50 being regenerated. Hydrocarbon sensor 55 will monitor the regeneration of the hydrocarbon-adsorbent material in the first canister 50 until that process is complete. Similar to the procedure described above, flow through that canister will then be stopped. This cycle continues as directed by controller 20 to maintain the tank ullage pressure within set limits.

It should be recognized that a situation could arise where the canister providing the regenerative flow could become saturated with hydrocarbon before regeneration of the other canister is complete. In this situation, controller 20 may stop vapor pump 32 and close all valves in the apparatus. Simultaneously, the controller 20 will generate an alarm to alert the operator of the apparatus of this condition.

After a number of adsorption/regeneration cycles, the hydrocarbon-adsorbent material will require replacement. The life of that material will vary depending on several factors including the volume of tank ullage being controlled, size of the canisters, ambient weather conditions and type of hydrocarbon-adsorbent material used.

The invention has been described with reference to a single tank. However, the scope of the present invention includes using the apparatus for multiple tank installations, adjusting the size of the canisters and other components as needed to handle the combined ullage of all the tanks. The practice of this invention also includes increasing the number of canisters beyond two as the demands of the particular application grow. For example, a third or a fourth canister may be added if the vapor production of the tank installation so requires. A person of ordinary skill may adjust the size and number of canisters without undue effort.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

What is claimed is:

1. A method for controlling the pressure in a tank ullage containing VOC vapors and non-polluting components comprising:
    a) monitoring the pressure in the fuel tank ullage;
    b) withdrawing vapor from the fuel tank ullage when the ullage pressure exceeds a threshold value;
    c) feeding the vapor through a first canister containing a VOC vapor adsorbing material and permitting non-polluting components to exit the first canister.
    d) exhausting a majority of the non-polluting components from the first canister to the atmosphere;
    e) feeding at least a portion of the non-polluting components from the first canister to a second canister containing a saturated VOC-adsorbing material to desorb VOC vapor therefrom; and
    f) returning the desorbed VOC vapor and the at least a portion of the nonpolluting components from the second canister to the fuel tank ullage.

2. The method of claim 1 further comprising halting feeding step e) when substantially all the VOC is desorbed from the VOC-adsorbing material in the second canister.

3. The method of claim 1 further comprising:
    a) monitoring the VOC level of the components exiting the first canister for a polluting level of VOC;
    b) shifting the feed of the withdrawn vapor to the second canister responsive to a polluting level of VOC exiting the first canister thereby permitting non-polluting vapor components to exit the second canister;
    c) exhausting a majority of the non-polluting components from the second canister to the atmosphere;
    d) feeding at least a portion of the non-polluting components from the second canister to the first canister to desorb VOC vapor therefrom; and
    e) returning the desorbed VOC vapor and the at least a portion of the nonolluting components from the first canister to the fuel tank ullage.

4. The method of claim 3 further comprising halting feeding step d) when substantially all the VOC is desorbed from the VOC-adsorbing material in the second canister.

5. The method of claim 1 further comprising passing the VOC vapors through a heat exchanger before returning the vapors to the fuel tank ullage.

6. The method of claim 1 further comprising monitoring the VOC content of the non-polluting components exhausting from the first canister and halting vapor withdrawal if an undesirable VOC content is detected.

7. The method of claim 1 further comprising monitoring the VOC content of the non-polluting components exhausting from the second canister and halting vapor withdrawal if an undesirable VOC content is detected.

8. A method for controlling the pressure in a fuel tank ullage containing VOC vapors and non-polluting components comprising:
    a) monitoring the pressure in the fuel tank ullage;
    b) withdrawing vapor from the fuel tank ullage when the ullage pressure exceeds a threshold value;
    c) feeding the vapor through a canister containing a VOC vapor adsorbing material;
    d) exhausting the non-polluting components exiting the canister to the atmosphere.

9. An apparatus for controlling a tank ullage pressure comprising:
    a) a vapor pump in communication with a fuel tank ullage;
    b) an inlet valve manifold in communication with the vapor pump and having a first exit and a second exit;
    c) a pressure sensor adapted for detecting the pressure in the fuel tank ullage;
    d) a first canister containing a VOC-adsorbent material positioned between the inlet valve manifold first exit and an exhaust manifold;
    e) a second canister containing a VOC-adsorbent material and positioned between the inlet valve manifold second exit and the exhaust manifold;
    wherein the exhaust valve manifold includes a first entrance in communication with the first canister, a second entrance in communication with the second canister, a first exit in communication with the tank ullage and a second exit connected to a recirculation line, the recirculation line connecting the inlet valve manifold and the exhaust valve manifold, at least one atmospheric vent;
    f) a controller adapted to receive input from the pressure sensor and output control signals to the vapor pump and apparatus manifolds to activate the vapor pump and control the inlet valve manifold and exhaust valve manifold when the ullage pressure exceeds a pressure threshold to vent substantially VOC-free air to the atmosphere and to return hydrocarbons trapped in the adsorbent material to the fuel tank ullage.

10. An apparatus according to claim 9 wherein the inlet valve manifold comprises:
   a) a first inlet valve positioned between the vapor pump and the valve manifold first exit;
   b) a second inlet valve positioned between the vapor pump and the valve manifold second exit;
   c) a first purge valve positioned between the recirculation line and the inlet valve manifold first exit; and
   d) a second purge valve positioned between the recirculation line and the inlet valve manifold second exit.

11. An apparatus according to claim 10 further comprising an interlock to prevent the first inlet valve and the second inlet valve from opening simultaneously.

12. An apparatus according to claim 10 further comprising an interlock to prevent the first purge valve and the second purge valve from opening simultaneously.

13. An apparatus according to claim 9 wherein the exhaust valve manifold comprises:
   a) a first return valve positioned between the first canister and the exhaust valve manifold first exit;
   b) a second return valve positioned between the second canister and the exhaust valve manifold second exit;
   c) a first atmospheric vent connected to the first canister;
   d) a second atmospheric vent connected to the second canister;
   e) a first recirculation valve positioned between the first canister and the recirculation line; and
   f) a second recirculation valve positioned between the second canister and the recirculation line.

14. An apparatus according to claim 13 further comprising an interlock to prevent the first return valve and the second return valve from opening simultaneously.

15. An apparatus according to claim 13 further comprising an interlock to prevent the first recirculation and the second recirculation valve from opening simultaneously.

16. An apparatus according to claim 13 further comprising an interlock to prevent the first atmospheric vent and the second atmospheric vent from opening simultaneously.

17. An apparatus according to claim 13 wherein the first recirculation valve and the second recirculation valve are proportional valves.

18. An apparatus according to claim 9 further comprising a flame arrestor in communication with and positioned upstream of the vapor pump.

19. An apparatus according to claim 9 further comprising a flame arrestor in communication with and positioned downstream of the vapor pump.

20. An apparatus according to claim 9 further comprising a heat exchanger positioned between the exhaust valve manifold and the tank ullage.

21. An apparatus according to claim 9 further comprising a first VOC vapor level detector positioned in the first canister and adapted to output a signal to the controller indicating VOC content of the flow exiting the first canister.

22. An apparatus according to claim 9 further comprising a second VOC vapor level detector positioned in the second canister and adapted to output a signal to the controller indicating VOC content of the flow exiting the second canister.

23. An apparatus according to claim 9 further comprising a heat exchanger positioned in said recirculation line.

24. An apparatus according to claim 9 further comprising at least one additional canister.

25. An apparatus for controlling a tank ullage pressure comprising:
   a) a vapor pump for withdrawing vapor from a fuel tank ullage;
   b) a pressure sensor adapted for detecting the pressure in the fuel tank ullage;
   c) a canister containing a VOC-adsorbent material downstream of the vapor pump;
   d) an exhaust manifold downstream of the canister to release VOC-depleted vapors to the atmosphere; and
   e) a controller adapted to receive input from the pressure sensor and to output control signals to the vapor pump to activate the vapor pump when the ullage pressure exceeds a pressure threshold to adsorb VOC in the VOC-adsorbent material and vent substantially VOC-free air to the atmosphere.

26. An apparatus for controlling a tank ullage pressure comprising:
   a) a vapor pump in communication with a fuel tank ullage;
   b) a pressure sensor adapted for detecting the pressure in the fuel tank ullage;
   c) an inlet valve manifold in communication with the vapor pump, wherein the inlet valve manifold has a first exit and a second exit;
   d) a first canister having an inlet and an exit containing a VOC-adsorbent material and in communication with the inlet valve manifold;
   e) a second canister having an inlet and an exit containing a VOC-adsorbent material and in communication with the inlet valve manifold;
   f) an exhaust valve manifold in communication with the first canister, the second canister, the tank ullage and a recirculation line connecting the inlet valve manifold and the exhaust valve manifold; and
   g) a controller adapted to receive input from the pressure sensor and output control signals to the vapor pump and apparatus valve manifolds to activate the vapor pump when the ullage pressure exceeds a pressure threshold to vent substantially VOC-free air to the atmosphere and to return VOC trapped in the adsorbent material to the fuel tank ullage.

27. An apparatus according to claim 26 wherein the inlet valve manifold comprises:
   a) a first inlet valve in communication with the first canister via the first exit;
   b) a second inlet valve in communication with the second canister via the second exit;
   c) a first purge valve in communication with the recirculation line and the first canister inlet; and
   d) a second purge valve in communication with the recirculation line and the second canister inlet.

28. An apparatus according to claim 26 wherein the exhaust valve manifold comprises:
   a) a first return valve positioned between the first canister exit and the tank ullage;
   b) a second return valve positioned between the second canister exit and the tank ullage;

c) a first atmospheric vent connected to the first canister exit;

d) a second atmospheric vent connected to the second canister exit;

e) a first recirculation valve positioned between the first canister exit and the recirculation line; and f) a second recirculation valve positioned between the canister outlet and the recirculation line.

29. The apparatus of claim 26 further comprising:

a) a first VOC level detector in the first canister; and b) a second VOC level detector in the second canister;

wherein the first level detector and the second level detector are adapted to output a signal to the controller indicating the VOC content of the flow exiting the first canister and the second canister.

* * * * *